(12) United States Patent
Salandre

(10) Patent No.: US 10,948,799 B2
(45) Date of Patent: Mar. 16, 2021

(54) COLOR-CHANGING VEHICLE INTERIOR PANEL

(71) Applicant: Faurecia Interior Systems, Inc., Auburn Hills, MI (US)

(72) Inventor: Maxime Salandre, Rochester, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 176 days.

(21) Appl. No.: 16/214,424

(22) Filed: Dec. 10, 2018

(65) Prior Publication Data

US 2020/0183246 A1    Jun. 11, 2020

(51) Int. Cl.

| G02F 1/167 | (2019.01) |
|---|---|
| G02F 1/1676 | (2019.01) |
| G02F 1/1677 | (2019.01) |
| B60R 13/02 | (2006.01) |
| B32B 27/36 | (2006.01) |
| B32B 27/08 | (2006.01) |

(52) U.S. Cl.
CPC .............. *G02F 1/167* (2013.01); *B32B 27/08* (2013.01); *B32B 27/365* (2013.01); *B60R 13/02* (2013.01); *B60R 13/0256* (2013.01); *G02F 1/1676* (2019.01); *G02F 1/1677* (2019.01); *B32B 2255/10* (2013.01); *B32B 2255/20* (2013.01); *B32B 2605/003* (2013.01); *B60R 2013/0287* (2013.01); *G02F 2202/36* (2013.01)

(58) Field of Classification Search
CPC ...... G02F 1/167; G02F 1/1678; G02F 1/1681; G02F 1/03; G02F 1/061; G02F 1/1676; G02F 1/1677; G02F 2001/1678; G02B 27/026; G02B 26/00; G02B 26/08; B60R 13/0256; B60R 13/02; B32B 27/365; B32B 27/02; B32B 2605/003; B32B 7/00; B32B 7/02; B32B 7/04; B32B 7/10; B32B 9/00; B32B 15/08; B32B 21/08; B32B 27/00; B32B 27/06; B32B 27/14; B32B 27/18; B32B 27/08; B29C 39/00
USPC ........................................................ 359/296
See application file for complete search history.

(56) References Cited

U.S. PATENT DOCUMENTS

| 2015/0261264 A1 | 9/2015 | Brown et al. |
| 2018/0229651 A1 | 8/2018 | Verwys et al. |

FOREIGN PATENT DOCUMENTS

| EP | 2904474 A1 | 8/2015 |
| WO | WO2005119772 A2 | 12/2005 |
| WO | WO2015069985 A1 | 5/2015 |

OTHER PUBLICATIONS

Kharisov et al. (2017). "Less-Common Nanostructures: Nanobuds: A Micro-Review". Recent Patents on Nanotechnology. vol. 11. No. 3.*

\* cited by examiner

*Primary Examiner* — Kristina M Deherrera
(74) *Attorney, Agent, or Firm* — Reising Ethington P.C.

(57) ABSTRACT

A vehicle interior panel includes a color-changing element with an active layer configured to change from a first color to a different second color when a voltage is applied across top and bottom electrode layers. The top electrode includes fullerenes in a configuration that is visibly transparent and permits the color-changing element to bend along sharp radii and/or stretch without losing electrical continuity. Fullerenes including ellipsoidal elements can provide these characteristics.

20 Claims, 2 Drawing Sheets

COLOR-CHANGING VEHICLE INTERIOR PANEL

TECHNICAL FIELD

The present disclosure is related generally to vehicle interior panels and, more particularly, to such panels having a user-selectable appearance.

BACKGROUND

Vehicle interior aesthetics can be a matter of personal taste. For example, one member of a vehicle-sharing family may have a design preference different from that of another family member. While vehicles have been made adaptive to different-sized occupants via adjustable seats, mirrors, and steering wheels, and adaptive to different environmental preferences via adjustable temperature air and seats, vehicle owners are generally unable to adjust the aesthetic appearance of the vehicle interior after their initial choice when purchasing the vehicle. This shortcoming may become even more noteworthy in an age of ride sharing and/or vehicle sharing among otherwise unassociated people.

WO 2015/069985 by Kring discloses a multi-layer film laminate for use in a vehicle interior. Kring purports to provide color-changeable materials beneath printed graphics to simulate different colors of wood grain, animal print, or other patterns. Unfortunately for vehicle interior designers, the Kring laminate is only useful on flat portions of the vehicle interior, such as the face of a glove box door. Kring fails to address application to vehicle interior panels having three-dimensional contours, particularly where the show surface of the panel includes sharp bends or deep-draw features. Under these conditions, the transparent electrode materials disclosed by Kring, such as indium tin oxide (ITO) crack, thereby interrupting its electrical conductivity and the ability of the laminate to change color.

SUMMARY

An illustrative vehicle interior panel includes a substrate, a color-changing element, and a film layer. The color-changing element is disposed over the substrate and includes an active layer disposed between a bottom electrode layer and a top electrode layer. The active layer is configured to change from a first color to a different second color when a voltage is applied across the electrode layers. The film layer is disposed over the color-changing element and is at least partially transparent to visible light. The top electrode layer includes ellipsoidal fullerenes and is at least partially transparent to visible light.

In some embodiments, the top electrode layer includes carbon nanotubes.

In some embodiments, carbon nanotubes of the top electrode layer are covalently bonded with the ellipsoidal fullerenes.

In some embodiments, each ellipsoidal fullerene is covalently bonded with only one carbon nanotube of the top electrode layer.

In some embodiments, the film layer comprises polycarbonate.

In some embodiments, the vehicle interior panel includes a surface feature having a radius of less than 200 millimeters. The electrical conductivity of the electrode layers is continuous across the radius such that the active layer changes color along the radius when the voltage is applied.

In some embodiments, the radius of a surface feature of the panel is less than 20 millimeters.

In some embodiments, the radius of a surface feature of the panel is less than 2 millimeters.

In some embodiments, the active layer comprises electrophoretic ink.

An illustrative method of making a vehicle interior panel includes the steps of forming a color-changing element and attaching the formed color-changing element to a vehicle interior panel substrate. The color-changing element is encapsulated between top and bottom polymeric film layers and is formed from a flat shape to a contoured shape having a radius of less than 200 millimeters. The color-changing element includes an active layer disposed between a bottom electrode layer and a top electrode layer, and the active layer is configured to change from a first color to a different second color when a voltage is applied across the electrode layers. The top film layer and the top electrode layer are at least partially transparent to visible light, and the electrode layers each comprise fullerenes configured so that continuity of the electrical conductivity of the electrodes is maintained after the step of forming, including along the formed radius.

In some embodiments, the fullerenes include ellipsoidal fullerenes and carbon nanotubes.

In some embodiments, carbon nanotubes of the electrode layers are covalently bonded with ellipsoidal fullerenes.

In some embodiments, at least one of the film layers comprises polycarbonate.

In some embodiments, the radius of the contoured shape is less than 20 millimeters.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel capable of changing colors in response to an applied voltage. The panel is constructed from a combination of material layers that enables the inclusion of sharp or deep features along a visible surface of the panel while maintaining the electrical continuity of a transparent electrode layer through which the color change is visible.

Figure 1:
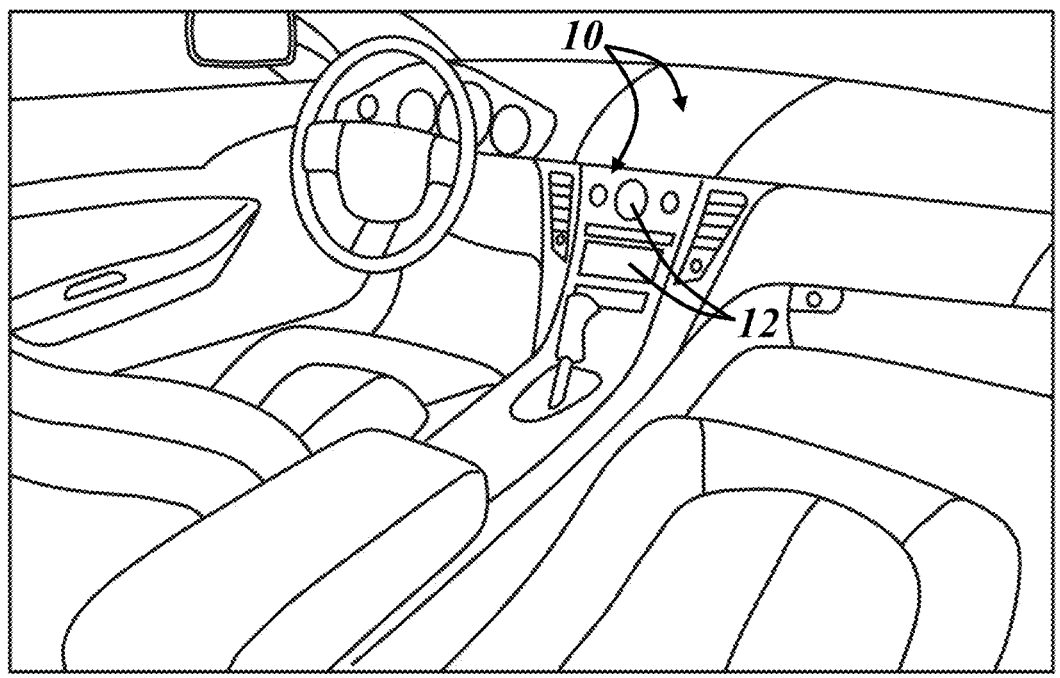
FIG. 1 is a perspective view of the interior of a vehicle passenger cabin equipped with color-changing vehicle interior panels.
Figure 2:
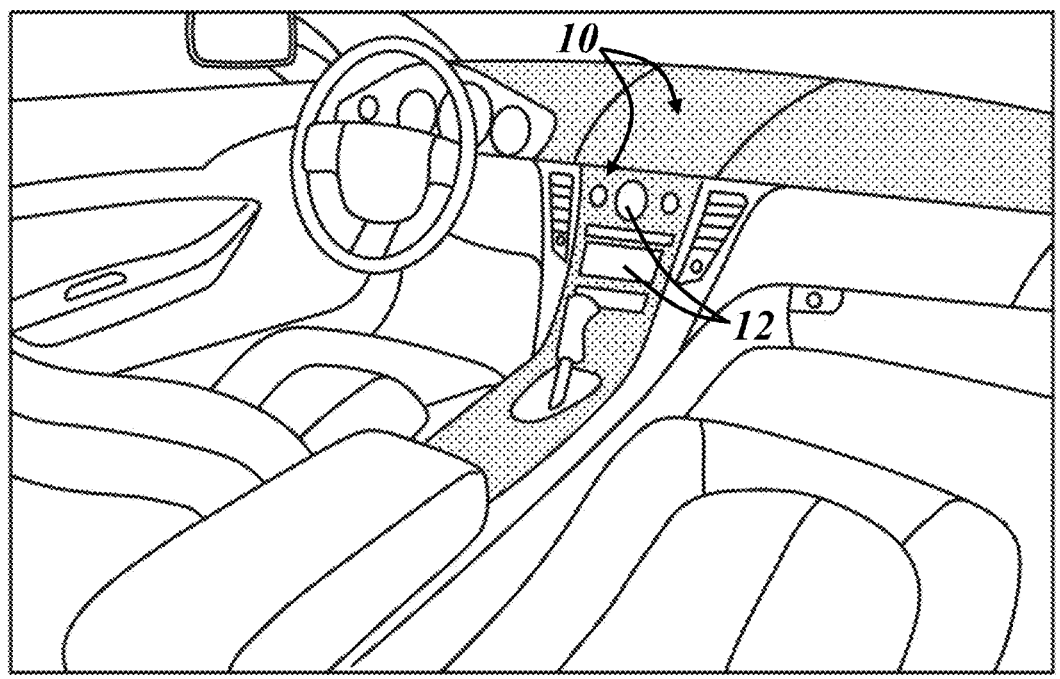
FIG. 2 depicts the color-changing vehicle interior panels of FIG. 1 after changing to a different color.

FIG. 1 is a perspective view of the interior of a vehicle passenger cabin equipped with color-changing vehicle interior panels 10, including an instrument panel and a console panel. FIG. 2 illustrates the same passenger cabin with the panels 10 changed to a second color that is different from a first color illustrated in FIG. 1. Here, the second color is illustrated schematically with shading, while the first color is illustrated with no shading. One of the illustrated color-changing panels 10 includes openings 12 formed through it to accommodate a vent, instrument, control, screen, or other functional element. As discussed below, such openings 12 are one potential location for tight radii and deeply drawn features along which conventional transparent electrically conductive materials (e.g., ITO) cannot be formed without breaking.

Figure 3:
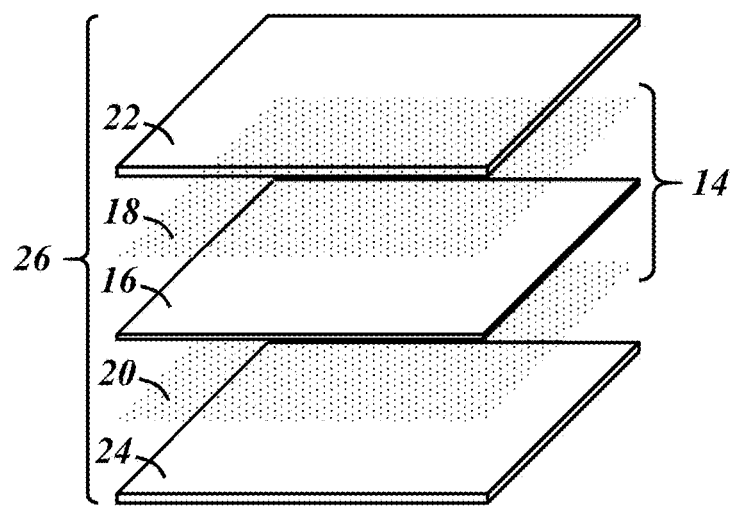
FIG. 3 is an exploded view of a color-changing laminate of the panel of FIGS. 1 and 2.

FIG. 3 offers an exploded view of a color-changing element 14, which includes an active layer 16 disposed between a top electrode layer 18 and a bottom electrode layer 20. The color-changing element 14 is disposed between a top film layer 22 and a bottom film layer 24 to form a color-changing laminate 26, which can be handled separately from other interior panel components during manufacture. The top film layer 22 and the top electrode layer 18 are at least partially transparent to visible light so that light can reach the active layer 16 and be reflected into the passenger cabin where the color is perceived by vehicle occupants.

The active layer 16 is configured to change from the first color to the second color when a voltage is applied across the electrode layers 18, 20. The active layer 16 may for example be a layer of electrophoretic ink including encapsulated pigments that are charged such that they move toward the top electrode layer 18 when the voltage is applied and toward the bottom electrode layer 20 when the voltage is not applied. As used herein, a change in color thus refers to a change in the color perceived by an observer viewing the active layer 16 or the panel 10. The active layer 16 may also be configured to change the perceived color among more than two colors by employing reversed polarity voltage and/or variable voltage coupled with pigment capsules carrying different electrical charges. The active layer 16 is not limited to electrophoretic ink and may include or be formed from any material that changes the perceived color with a change in applied voltage across the electrode layers 18, 20, such as photonic crystal-based materials.

Each electrode layer 18, 20 may be configured to endure bending and stretching in a manner superior to conventional transparent metal oxides such as ITO. At least the top electrode layer 18 includes fullerenes, which are allotropes of carbon synthesized in various hollow geometric shapes. Examples of fullerenes include carbon nanotubes (CNTs) and spheroidal fullerenes, which are commonly known as buckyballs. $C_{60}$ is the most well-known spheroidal fullerene, but other ellipsoidal fullerenes (of which spheroidal fullerenes are a subset) may be suitable. Certain combinations of fullerenes have been found to provided sufficient electrical conductivity in a transparent electrode layer while also enabling stretching and bending of the color-changing laminate 26 without loss of electrical continuity.

Figure 4:
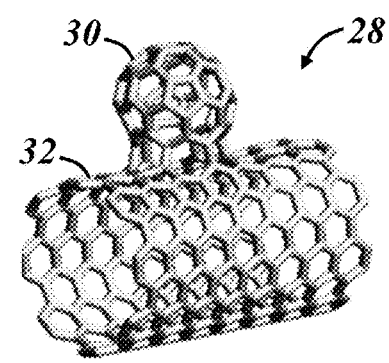
FIG. 4 is a schematic view of a fullerene for use in an electrode layer of the laminate of FIG. 3.

One particular example of a suitable fullerene is a nanobud 28. FIG. 4 is a schematic illustration of the chemical structure of a portion of a carbon nanobud 28, which includes a spheroidal fullerene 30 covalently bonded with a CNT 32. In this particular example, six covalent carbon-carbon bonds are formed between the spheroidal fullerene and the CNT. The CNT 32 may extend orders of magnitude more than its nanoscale diameter in its lengthwise direction, and each CNT may include more than one spheroidal fullerene 30. Each spheroidal fullerene 30 may be bonded with only one of the CNTs 32 in the corresponding electrode layer. A greater or lesser amount of covalent bonds between the nanospheroid and the nanotube is possible. The spheroidal fullerene may alternatively be covalently bonded with the CNT via intermediary linkages, such as an ester linkage, or there may be intervening carbon-carbon bonds between the spheroid and the CNT.

The spheroidal or ellipsoidal fullerene 30 is believed to offer certain benefits in the electrode layers 18, 20, particularly when paired with conductive nanostructures such as CNTs. For example, when a layer of CNTs is stretched or bent, the individual CNTs can slide past one another and thereby maintain electrical continuity. This alone is better than metal oxides like ITO. The presence of the spheroidal fullerenes 30 is believed to allow even greater elongation and localized strain as the CNTs slide past one another by the spheroids hooking onto or otherwise interacting with a passing nanotube to cause it to straighten during elongation and thereby maintain electrical continuity among the layer of CNTs. In other words, the spheroidal "buds" may help the CNTs to remain entangled as they are straightened out during elongation of the electrode layer. This may work with other non-carbon conductive nanotubes or other conductive nanostructures such as nanofibers or nanowires.

The electrode layers 18, 20 can be suitably conductive at optically transparent layer thicknesses, such as less than 0.4 μm. One or both electrode layers may include tubular and/or ellipsoidal fullerenes. In some embodiments, one or both electrode layers 18, 20 include a metallic conductor in nanostructure form, such as silver nanowires or silver nanoparticles, while maintaining at least partial transparency in the layer. Transparency need only be maintained in the top electrode layer when part of the vehicle interior panel. The bottom electrode layer 20 may be a reflective metallic layer, for example. The electrode layers 18, 20 can be formed directly on the respective film layers 22, 24 by suitable deposition methods known to nanostructure manufacturers, and the color-changing active layer 16 can be subsequently formed over one of the electrode layers 18, 20 by suitable deposition methods known to the pigment manufacturers.

Figure 5:
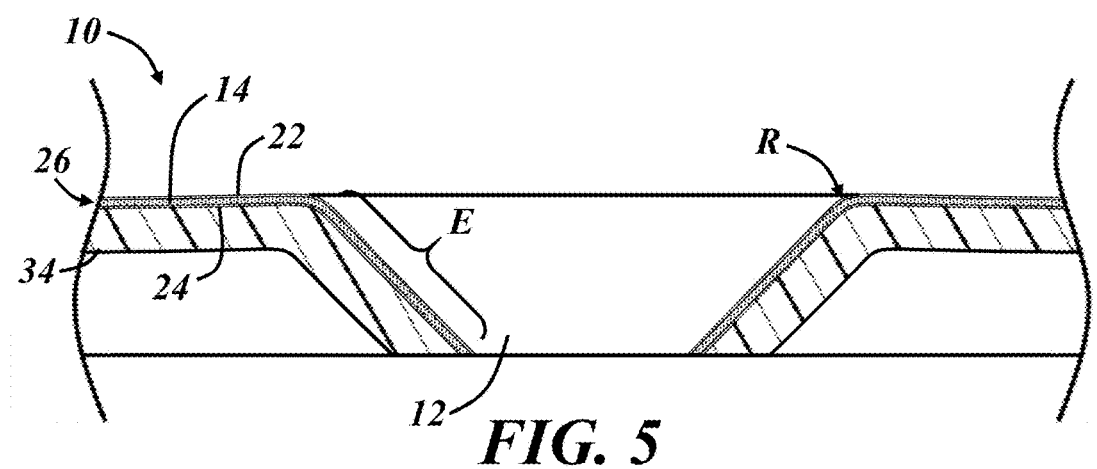
FIG. 5 is a cross-sectional view of a portion of a vehicle interior panel such as that of FIGS. 1 and 2.

FIG. 5 is a cross-sectional view of a portion of a vehicle interior panel 10 such as those of FIG. 1. The illustrated panel 10 includes a substrate 34 with the above-described color-changing laminate 26 disposed over the substrate. The substrate 34 is essentially a support element for the laminate 26 and may provide the overall shape and structural rigidity to the panel. The substrate may be an injection molded thermoplastic, such as glass-reinforced polypropylene or a polycarbonate/ABS alloy. The laminate 26 may be affixed to the substrate 34 in any suitable manner, such as lamination, adhesive, or by molding the substrate directly onto the bottom film layer 24, for example.

The top and bottom film layers 22, 24 may be polymeric films. The top film layer 22 is at least partially transparent to visible light, while the bottom layer 24 can be at least partially transparent to visible light or opaque. The film layers 22, 24 may range in thickness from 25 μm to 250 μm, for example. Examples of optically transparent film layers include certain polyethylene terephthalate (PET), acrylic, polyvinyl chloride (PVC), polyethylene, and polycarbonate films. It has surprisingly been found that polycarbonate may outperform PET in vehicle interior panel applications including surface features with sharp bends and/or deeply drawn features. For example, while nominal properties for plastic materials indicate that PET has a higher percent tensile elongation than polycarbonate, polycarbonate outperforms PET in thermoforming operations in which the film is at an elevated temperature during forming. Polycarbonate film layers have also been found to experience less wrinkling under these conditions and does not exhibit strain-induced crystallization, which shows up as white streaks in stretched PET.

The panel 10 of FIG. 5 includes an opening 12 formed therethrough, as described above with reference to FIGS. 1 and 2. The opening 12 may be formed during a film-forming operation (e.g., thermoforming, vacuum forming, or vacuum thermoforming). An illustrative method of making the vehicle interior panel 10 includes the steps of forming the color-changing element 14, while encapsulated between the top and bottom film layers 22, 24, from a flat shape to a contoured shape having at least one out-of-plane radius (R). The formed radius can be less than 200 mm, which is smaller than is possible with ITO when deposited on PET films, while maintaining continuity in the electrode layers of the formed element 14. Indeed, with fullerene-based electrode layers as described above, the formed radius can be less than 20 mm, less than 2 mm, and down to a fraction of a millimeter, while maintaining electrical continuity in the electrode layers.

The contoured shape may additionally have a high-elongation region (E). This region results from the surrounding region being held in place by a forming tool while a cup-shaped tool portion stretches the laminate 26 and punches the opening 12 during the forming step. The strain in the high-elongation region (E) can be greater than 0.01 (1% elongation), which is greater than is possible with ITO when deposited on a PET film, while maintaining continuity in the electrode layers. With fullerene-based electrode layers, the strain in the high-elongation region (E) can be greater than 0.1 (10% elongation), greater than 1.0 (100% elongation), up to the maximum strain of which the polymeric film layers are capable, such as 2.0 (200% elongation) or more.

Variations on the exemplary embodiments described above are contemplated. For example, at least a portion of the bottom electrode layer could be formed directly on the substrate rather than deposited on the bottom film layer—via coating techniques such as painting, plating, or vapor deposition, for example. Or the step of forming the color-changing element from a flat shape to a contoured shape could be achieved via the heat and pressure of an injection molding material used to form the substrate on the bottom film layer. Other material layers may also be included, such as a foam material layer as part of the substrate or between the substrate and the color-changing element, or a protective layer over the top film layer, to name a few examples. Additionally, while depicted with the entire visible surface of the vehicle interior panel changing color, the laminate can be configured so that only a portion changes color. For example, the bottom electrode layer could be patterned in a specific shape or include an active controllable matrix of bottom electrodes to selectively change the color of individual pixels.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:
   a substrate;
   a color-changing laminate disposed over the substrate and including an active layer disposed between a bottom electrode layer and a top electrode layer, the electrode layers being disposed between top and bottom film layers of the laminate, the active layer being configured to change from a first color to a different second color when a voltage is applied across the electrode layers, and the top film layer being at least partially transparent to visible light;
   an opening formed through the color-changing laminate; and
   a bend in the color-changing laminate along a visible surface of the panel,
   wherein the bend includes a radius of less than 200 millimeters surrounding the opening,
   wherein the electrode layers each have an electrical conductivity that is continuous across the bend such that the active layer changes color across the bend when the voltage is applied, and
   wherein the top electrode layer comprises ellipsoidal fullerenes and is at least partially transparent to visible light.

2. The vehicle interior panel of claim 1, wherein the top electrode layer includes carbon nanotubes.

3. The vehicle interior panel of claim 2, wherein the carbon nanotubes are covalently bonded with the ellipsoidal fullerenes.

4. The vehicle interior panel of claim 3, wherein each ellipsoidal fullerene is covalently bonded with only one of the carbon nanotubes.

5. The vehicle interior panel of claim 1, wherein the film layer comprises polycarbonate.

6. The vehicle interior panel of claim 1, wherein the radius is less than 1 millimeter.

7. The vehicle interior panel of claim 1, wherein the radius is less than 20 millimeters.

8. The vehicle interior panel of claim 1, wherein the radius is less than 2 millimeters.

9. The vehicle interior panel of claim 1, wherein the active layer comprises electrophoretic ink.

10. A method of making a vehicle interior panel, comprising the steps of:
    providing a color-changing laminate comprising a color-changing element disposed between a top polymeric film layer and a bottom polymeric film layer, the color-changing laminate having a flat shape;
    thermoforming the color-changing laminate from the flat shape to a contoured shape having an out-of-plan radius of less than 200 millimeters, wherein the step of thermoforming includes forming a permanent bend in the laminate with the out-of-plane radius located along the bend; and attaching the thermoformed color-changing laminate to a vehicle interior panel substrate, wherein the color-changing element comprises an active layer disposed between a bottom electrode layer and a top electrode layer, the active layer being configured to change from a first color to a different second color when a voltage is applied across the electrode layers, wherein the top film layer and the top electrode layer are at least partially transparent to visible light, and wherein the electrode layers each comprise fullerenes configured so that continuity of the electrical conductivity of the electrodes is maintained after the step of thermoforming, including along the formed radius.

11. The method of claim 10, wherein the fullerenes include ellipsoidal fullerenes and carbon nanotubes.

12. The method of claim 11, wherein the carbon nanotubes are covalently bonded with the ellipsoidal fullerenes.

13. The method of claim 10, wherein at least one of the film layers comprises polycarbonate.

14. The method of claim 10, wherein the radius is less than 20 millimeters.

15. The method of claim 10, wherein the active layer comprises electrophoretic ink.

16. The method of claim 10, wherein the contoured shape includes an elongated region resulting from a region surrounding the elongated region being held in place by a forming tool while a tool portion stretches the laminate during the step of thermoforming such that a strain in the elongated region is greater than 0.01.

17. The method of claim 10, further comprising the step of punching an opening through the laminate.

18. The method of claim 17, wherein the bend surrounds the opening and a region of the contoured surface located between the bend and the opening has a strain greater than 0.01.

19. The method of claim 10, wherein the radius is less than 20 millimeters and the contoured surface has a region adjacent the radius with a strain greater than 0.1.

20. The method of claim 19, wherein the radius is less than 2 millimeters or the strain is greater than 1.0.

* * * * *